(12) United States Patent
Liew et al.

(10) Patent No.: US 10,175,067 B2
(45) Date of Patent: Jan. 8, 2019

(54) SCHEME FOR INTERRUPT-BASED MOTION REPORTING

(71) Applicant: PixArt Imaging (Penang) SDN. BHD., Penang (MY)

(72) Inventors: Tong Sen Liew, Penang (MY); Boon-How Kok, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 74 days.

(21) Appl. No.: 14/964,501

(22) Filed: Dec. 9, 2015

(65) Prior Publication Data

US 2017/0167898 A1 Jun. 15, 2017

(51) Int. Cl.
| | | |
|---|---|---|
| *G01B 11/14* | (2006.01) | |
| *G01D 5/28* | (2006.01) | |
| *B41J 29/38* | (2006.01) | |
| *G06F 3/00* | (2006.01) | |
| *G06F 3/03* | (2006.01) | |
| *G06F 3/0354* | (2013.01) | |

(52) U.S. Cl.
CPC ............ *G01D 5/28* (2013.01); *B41J 29/38* (2013.01); *G06F 3/00* (2013.01); *G06F 3/0317* (2013.01); *G06F 3/0354* (2013.01)

(58) Field of Classification Search
CPC ......... B41J 29/38; B41J 11/0095; G01D 5/28; G01B 11/14; G06F 3/033; G06F 3/0421; G06F 3/042; G06F 3/0317; G06F 3/03543; H04N 5/374

USPC ..... 356/614–623; 250/221, 221.1, 216, 239; 345/163, 156, 166, 173, 175

See application file for complete search history.

(56) References Cited

U.S. PATENT DOCUMENTS

| | | | | |
|---|---|---|---|---|
| 5,074,690 | A * | 12/1991 | Del Signore, II | B41J 19/207 400/279 |
| 8,525,858 | B2 * | 9/2013 | Herring | B41J 15/042 347/171 |
| 9,874,943 | B2 * | 1/2018 | Song | G06F 3/0317 |
| 9,927,884 | B2 * | 3/2018 | Tan | G06F 3/03543 |
| 2003/0043388 | A1 * | 3/2003 | Andrews | G06K 15/00 358/1.7 |
| 2005/0024409 | A1 * | 2/2005 | Ehrhardt | B41J 3/4075 347/16 |
| 2005/0162393 | A1 * | 7/2005 | Ahn | G06F 3/0317 345/166 |
| 2006/0256086 | A1 * | 11/2006 | Xie | G06F 3/0317 345/166 |
| 2009/0295729 | A1 * | 12/2009 | Kuo | G06F 3/0317 345/166 |
| 2013/0120262 | A1 * | 5/2013 | Piot | G06F 3/03541 345/163 |
| 2014/0015750 | A1 * | 1/2014 | Chen | G06F 3/0383 345/163 |
| 2015/0015491 | A1 * | 1/2015 | Lee | G06F 3/0346 345/166 |

(Continued)

*Primary Examiner* — Hoa Pham
(74) *Attorney, Agent, or Firm* — Winston Hsu

(57) ABSTRACT

A method for reporting motion information from an electronic device to a remote host device includes: using an optical sensor for sensing the motion information of the electronic device, the optical sensor being configured within the electronic device; and reporting a motion result of the electronic device to the remote host device based on the optical sensor when the electronic device has moved a predetermined distance each time.

11 Claims, 5 Drawing Sheets

(56) References Cited

U.S. PATENT DOCUMENTS

2015/0285623 A1* 10/2015 Tachibana .............. G01B 11/14
            250/341.8
2016/0039148 A1*  2/2016 Marino ............... B29C 67/0088
            425/150
2017/0364165 A1* 12/2017 Chang ................. G06F 3/03543

* cited by examiner

SCHEME FOR INTERRUPT-BASED MOTION REPORTING

BACKGROUND OF THE INVENTION

1. Field of the Invention

The present invention relates to a motion report scheme, and more particularly to an electronic device and method for reporting motion information of electronic device to a remote host device.

2. Description of the Prior Art

Generally speaking, in a conventional scheme, a remote host device is arranged for polling an electronic device such as a printer or an optical mouse for obtaining a moving distance of a print head of the printer or a moving distance of the optical mouse. However, the difference between the working rates of remote host device and electronic device and the latency usually cause that the distance value actually read out by the remote host device is inconsistent to the motion of print head or optical mouse. The distance error is even significant. To solve this problem, the conventional scheme may increase the polling rate. However, this inevitably introduces the penalty of higher power consumption.

SUMMARY OF THE INVENTION

Therefore one of the objectives of the present invention is to provide a novel scheme for reporting precise motion information of electronic device to a remote host device, to solve the above-mentioned problem.

According to embodiments of the present invention, a method for reporting motion information from an electronic device to a remote host device is disclosed. The method comprises: using an optical sensor for sensing the motion information of the electronic device, the optical sensor being configured within the electronic device; and reporting a motion result of the electronic device to the remote host device based on the optical sensor when the electronic device has moved a predetermined distance each time.

According to the embodiments of the present invention, an optical sensor configured within an electronic device connected to a remote host device is disclosed. The optical sensor comprises a sensing circuit and a controller. The sensing circuit is configured for sensing the motion information of the electronic device. The controller is coupled to the optical sensor and configured for reporting a motion result of the electronic device to the remote host device based on the sensing circuit when the electronic device has moved a predetermined distance each time.

According to the embodiments, an optical mouse is disclosed. The optical mouse comprises an optical sensor. The optical sensor is configured for sensing the motion information of the electronic device, and reporting a motion result of the optical device to a remote host device based on the sensing circuit when the optical device has moved a predetermined distance each time.

By the optical sensor mention above, it is helpful for improving the accuracy and precision in printing application and/or optical mouse application.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
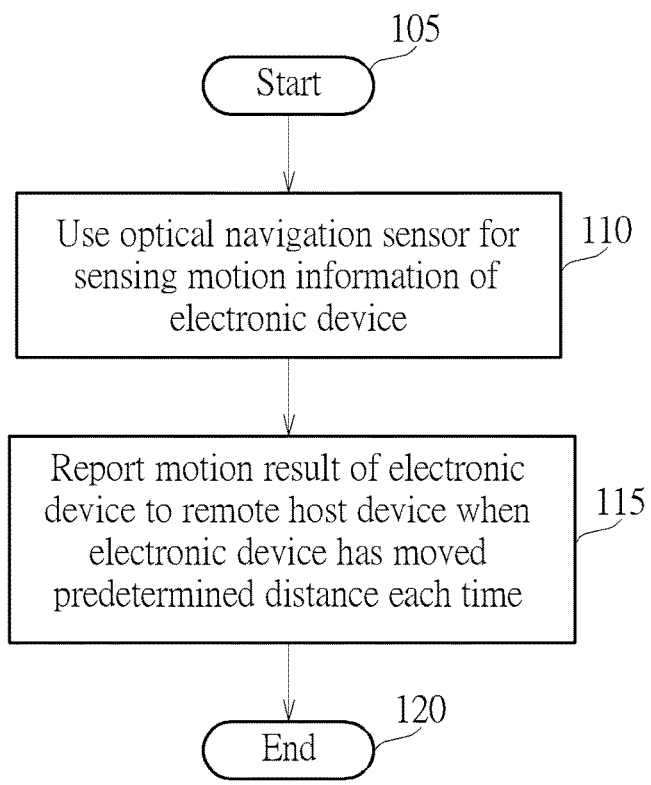
FIG. 1 is a diagram illustrating a flowchart of a method for reporting motion information from an electronic device to a remote host device according to embodiments of the present invention.

Please refer to FIG. 1, which is a diagram illustrating a flowchart of a method for reporting motion information from an electronic device to a remote host device according to embodiments of the present invention. The electronic device as recited in this application can be a movable electronic device with a fixed or varied moving speed, or can include a movable device with a fixed or varied moving speed. For example, the electronic device can be an optical mouse, or can be a printing system (printer) including a movable device such as a print head; however, this is not intended to be a limitation of the invention. The motion information indicates the moving distance of the electronic device from a specific displacement to another different displacement. It should be noted that the electronic device can move forward or backward in one direction or can move in two directions or in three directions. Provided that substantially the same result is achieved, the steps of the flowchart shown in FIG. 1 need not be in the exact order shown and need not be contiguous, that is, other steps can be intermediate. Steps of FIG. 1 are detailed in the following:

Step 105: Start;

Step 110: Use an optical navigation sensor for sensing the motion information of the electronic device wherein the optical sensor is configured within the electronic device;

Step 115: report a motion result of the electronic device to the remote host device based on the optical sensor when the electronic device has moved a predetermined distance to a displacement each time; and Step 120: End.

Figure 2:
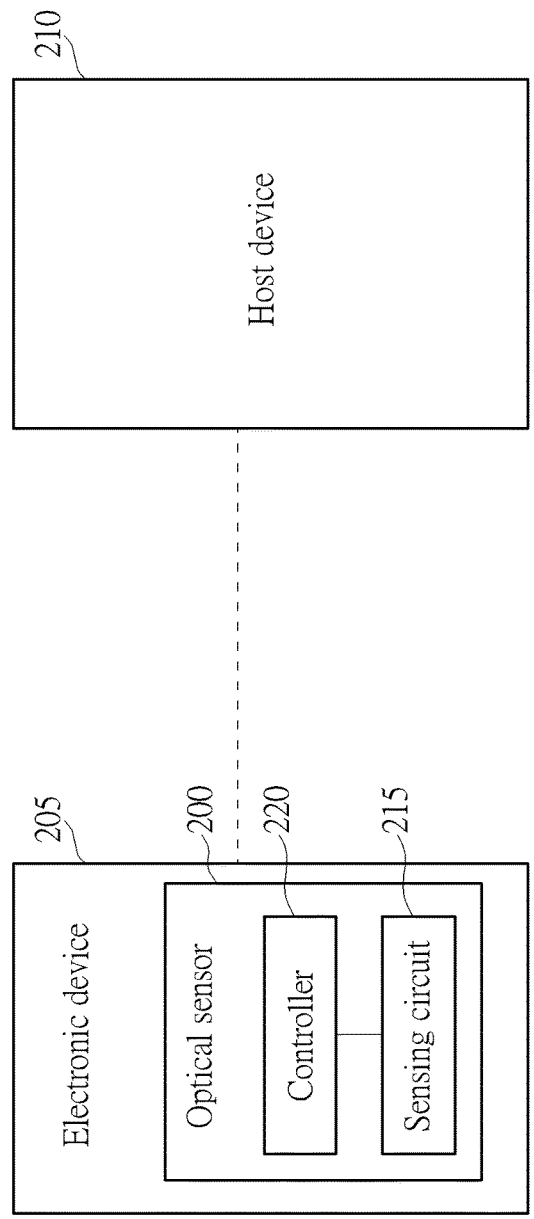
FIG. 2 is a simplified diagram of an optical sensor based on the flowchart of FIG. 1 according to an embodiment of the invention.

In the embodiments, the predetermined distance is configured as a fixed distance. The optical sensor is an optical navigation sensor. The motion result of the electronic device is reported by the optical sensor to the remote host device when the electronic has moved the fixed distance to another different displacement each time. The operation and implementation of optical sensor is shown in FIG. 2. FIG. 2 is a simplified diagram of an optical sensor 200 based on the flowchart of FIG. 1 according to an embodiment of the invention. The optical sensor 200 is configured within an electronic device 205 connected to a remote host device 210, and comprises a sensing circuit 215 and a controller 220. The sensing circuit 215 is configured for sensing the motion information of the electronic device 205. The controller 220 is configured for reporting a motion result of the electronic device 205 to the remote host device 210 based on the sensing circuit 215 when the electronic device 205 has moved the predetermined distance to the displacement each time. In practice, the sensing circuit 215 is arranged to sense the movement of the electronic device 205 or the movement of a movable device included by the electronic device 205, to generate the motion information for the controller 220. Based on the sensed motion information, the controller 220 is arranged to determine whether the electronic device 205 (or the movable device included by the electronic device 205) has moved the predetermined distance from a specified displacement to another different displacement, generate the motion result for the electronic device 205 when deciding that the electronic device 205 (or the movable device included by the electronic device 205) has moved the predetermined distance each time, and to report the generated motion result to the remote host device 210. It is not required for the remote host device 210 to poll the electronic device 205 for obtaining a location since the electronic device 205 reports the motion result/information indicating the location of electronic device 205 (or the location of movable device included by electronic device 205). That is, the electronic device 205 is arranged to issue an interrupt to the remote host device 210 each time when the electronic device 205 (or the movable device included by the electronic device 205) has moved the predetermined/fixed distance.

Figure 3A:
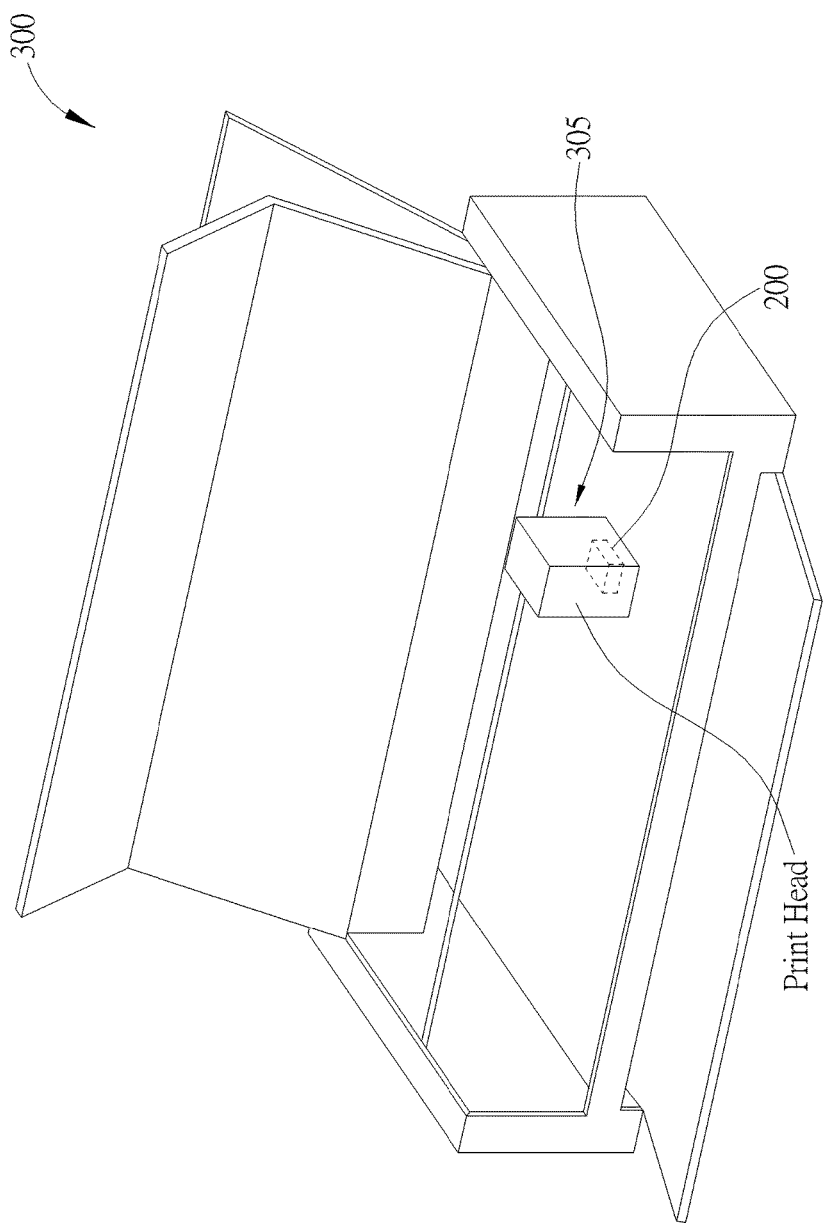
FIG. 3A is a simplified diagram illustrating an example of electronic device implemented as a printer including a print head according to an embodiment of the invention.

In one embodiment, the electronic device 205 is implemented as a printing system (printer). FIG. 3A is a simplified diagram illustrating an example of electronic device 205 implemented as a printer 300 including a print head 305 according to an embodiment of the invention. The printer 300 further comprises the optical sensor 200 which can be configured within the print head 305, positioned on the print head 305, or positioned on a corresponding print head holder. The position of optical sensor 200 is not meant to be a limitation of the invention. The print head 305 can move forward or backward in one direction, and the optical sensor 200 can sense the movement of print head 305 and reports the motion result of print head 305 to a remote host device (not shown in FIG. 3A) when print head 305 has moved the predetermined distance each time. In practice, the controller 220 determines whether the print head 305 has moved the predetermined distance, generates a motion/movement result for the print head 305 when deciding that the print head 305 has moved the predetermined distance each time, and reports the generated motion/movement result from the printer 300 to the remote host device.

Figure 3B:
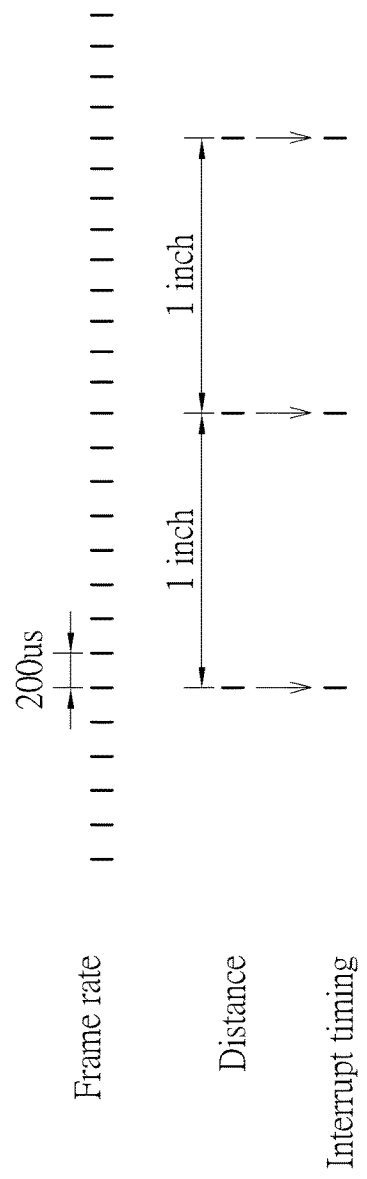
FIG. 3B is a diagram illustrating an example of the relation between the distance, the frame rate of optical sensor, and interrupt timing of optical sensor according to the embodiment as shown in FIG. 3A.

FIG. 3B is a diagram illustrating an example of the relation between the distance, the frame rate of optical sensor 200, and interrupt timing of optical sensor 200 according to the embodiment as shown in FIG. 3A. For example, the printer 300 is arranged to print on fixed distance/displacement (e.g. every one inch) by moving print head 305 at a constant speed of 10 ips (inch per second); however, this is not meant to be a limitation. The optical sensor 200 is installed on print head 305 and is arranged to run with 5000 fps (frame per second). That is, the optical sensor 200 installed on print head 305 moves at 0.002 inch per frame. The optical sensor 200 is configured to run at 5000 fps and calculates/accumulates the movement/motion of print head 305 at every frame. Whenever the accumulated movement/motion reach the predetermined/preset distance/displacement (e.g. one inch in this example), the optical sensor 200 is arranged to trigger an interrupt to the remote host device to wake up the remote host device to perform necessary action (s). As shown in FIG. 3B, the first accumulated distance and the second accumulated distance both are identical to one inch, and the first and second distances respectively correspond to different frame numbers. This shows that the optical sensor 200 is capable of reporting a precise distance value to a remote host device even though the frame rate may be slightly shifted.

Compared to a traditional scheme, the traditional scheme may adopt a remote host device to poll a remote printer device at every one millisecond (1 ms). However, even though a print head of the remote printer device moves at a constant speed, the printer head's movement/motion actually read by the remote host device after polling the remote printer device is inconsistent since the polling rate of remote host device is different from the working rate of the print head and the remote host device and print head are not ideally synchronous. Thus, the printer head's movement/motion actually read by the remote host device is not accurate enough, and the distance error of the traditional scheme is an uncontrolled variant and cannot be effectively reduced. In the embodiments, the optical sensor 200 calculates/accumulates the movement/motion of print head 305 at every frame and reports the motion result to the remote host device each time once the accumulated moving distance has reached predetermined/preset value (one inch), and thus the distance error can be significantly decreased or reduced. Compared with the traditional scheme, the benefits of this embodiment will become better when a print head can be designed to move with a variable moving speed. In addition, the distance error of traditional scheme may become significant due to the latency of motion read to actual printing action. However, the distance error of this embodiment can be still significantly decreased or reduced. Further, in this embodiment, I/O communication time between the remote host device and printer 300 can be decreased since it is not required to poll the printer 300 to read the motion of printer 300.

Figure 4:
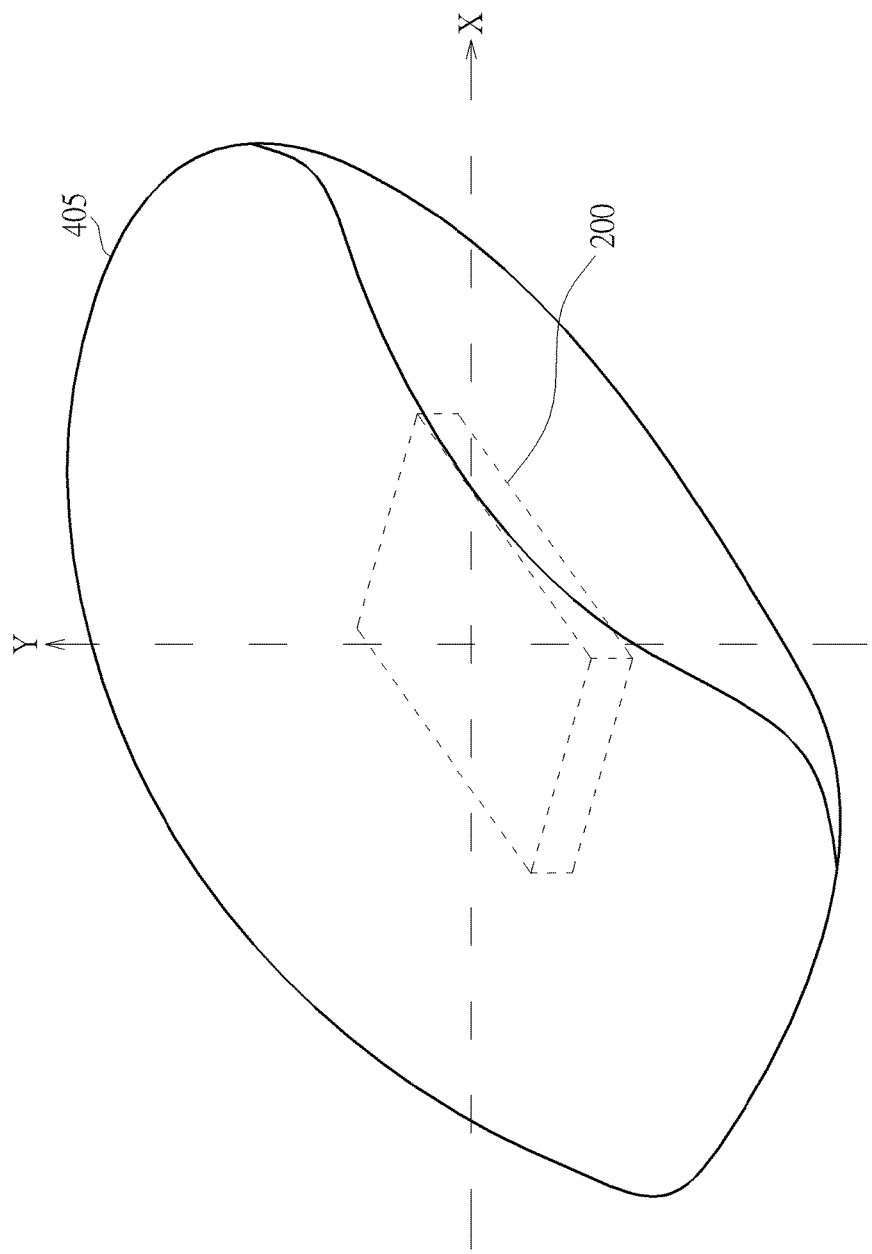
FIG. 4 is a diagram illustrating an optical mouse including the optical sensor of FIG. 2 according to an embodiment of the invention.

Further, in another embodiment, the electronic device 205 shown in FIG. 2 can be implemented as an optical mouse. FIG. 4 is a diagram illustrating an optical mouse 405 including the optical sensor 200 of FIG. 2 according to an embodiment of the invention. The optical mouse 405 can move in two directions (x-axis direction and y-axis direction) or in any directions on the surface, and the optical sensor 200 can sense the movement of optical mouse 405 and reports the motion result of optical mouse 405 to a remote host device (not shown in FIG. 4) when optical mouse 405 has moved the predetermined distance each time. In practice, the controller 220 determines whether the optical mouse 405 has moved the predetermined distance, generates a motion/movement result for optical mouse 405 when deciding that optical mouse 405 has moved the predetermined distance each time, and reports the generated motion/movement result from the optical mouse 405 to the remote host device. The motion/movement result comprises two-dimension (x-axis direction and y-axis direction) motion information of the optical mouse 405. In addition, the optical sensor 200 is further arranged for reporting the moving distance $\Delta x$ at x-axis direction and the moving distance $\Delta y$ at y-axis direction to the remote host device so that the remote host device can display cursor location according to the report information of the optical sensor 200 when each time the remote host device is interrupted by the optical sensor 200 of optical mouse 405.

Additionally, it should be noted that the electronic device 205 of FIG. 2 can be implemented as a plotter device in other embodiments; the description is not detailed for brevity.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for reporting motion information from an electronic device to a remote host device, comprising:

using an optical sensor for sensing the motion information of the electronic device on a plane, the optical sensor being configured within the electronic device and operating with a predetermined frame rate to sense and generate frames;

calculating a distance per frame based on a fixed or varied moving speed of the electronic device and the predetermined frame rate;

determining a moving distance of the electronic device on the plane according to a number of the sensed frames, detected by the optical sensor, and the distance per frame; and reporting a motion result of the electronic device to the remote host device based on the optical sensor when the moving distance of the electronic device on the plane reaches a same predetermined distance each time.

2. The method of claim 1, wherein the electronic device is a printer comprising a print head, the optical sensor is configured for sensing motion of the print head, and the reporting step comprises:

determining whether the print head has moved the same predetermined distance;

generating the motion result for the print head when deciding that the print head has moved the same predetermined distance each time; and reporting the generated motion result from the printer to the host.

3. The method of claim 1, wherein the electronic device is an optical mouse, the optical sensor is configured for sensing motion of the optical mouse, and the reporting step comprises:

determining whether the optical mouse has moved the same predetermined distance;

generating the motion result for the optical mouse when deciding that the optical mouse has moved the same predetermined distance each time; and reporting the generated motion result from the optical mouse to the host.

4. The method of claim 3, wherein the motion result comprises two-dimension motion information of the optical mouse.

5. The method of claim 1, further comprising:

configuring the same predetermined distance as a fixed distance.

6. An optical sensor configured within an electronic device connected to a remote host device, comprising:

a sensing circuit, configured for sensing the motion information of the electronic device on a plane and operating with a predetermined frame rate to sense and generate frames; and a controller, coupled to the sensing circuit, configured for reporting a motion result of the electronic device to the remote host device based on the sensing circuit when the electronic device has moved a same predetermined distance each time;

wherein the controller is arranged to calculate a distance per frame based on a fixed or varied moving speed of the electronic device and the predetermined frame rate, and a moving distance of the electronic device on the plane is determined according to a number of the sensed frames, detected by the sensing circuit, and the distance per frame; the motion result of the electronic device is reported to the remote host device when the moving distance of the electronic device on the plane reaches the same predetermined distance.

7. The optical sensor of claim 6, wherein the electronic device is a printer comprising a print head, the sensing circuit is configured for sensing motion for the print head; and the controller is arranged for determining whether the print head has moved the same predetermined distance, generating the motion result of the print head when deciding that the print head has moved the same predetermined distance each time, and reporting the generated motion result from the printer to the remote host device.

8. The optical sensor of claim 6, wherein the electronic device is an optical mouse, the sensing circuit is configured for sensing motion of the optical mouse; and the controller is arranged for determining whether the optical mouse has moved the same predetermined distance, generating the motion result of the optical mouse when deciding that the optical mouse has moved the same predetermined distance each time, and reporting the generated motion result from the optical mouse to the remote host device.

9. The optical sensor of claim 8, wherein the motion result comprises two-dimension motion information of the optical mouse.

10. The optical sensor of claim 6, wherein the same predetermined distance is configured as a fixed distance.

11. An optical mouse, comprising:

an optical sensor, operating with a predetermined frame rate to sense and generate frames, configured for sensing the motion information of an optical mouse on a plane, and reporting a motion result of the optical mouse based on the sensing circuit to a remote host device when the optical mouse has moved a same predetermined distance each time;

wherein a distance per frame is calculated based on a fixed or varied moving speed of the optical mouse and the predetermined frame rate, and a moving distance of the optical mouse on the plane is determined according to a number of the sensed frames, detected by the optical sensor, and the distance per frame; the motion result of the optical mouse is reported to the remote host device when the moving distance of the optical mouse on the plane reaches the same predetermined distance each time.

* * * * *